United States Patent
Tsuchitoi

(10) Patent No.: US 10,212,183 B2
(45) Date of Patent: Feb. 19, 2019

(54) INFORMATION PROCESSING APPARATUS THAT PREVENTS UNAUTHORIZED ACCESS THERETO, METHOD OF CONTROLLING THE INFORMATION PROCESSING APPARATUS, AND STORAGE MEDIUM

(71) Applicant: CANON KABUSHIKI KAISHA, Tokyo (JP)

(72) Inventor: Naoki Tsuchitoi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 15/151,790

(22) Filed: May 11, 2016

(65) Prior Publication Data
US 2016/0337393 A1 Nov. 17, 2016

(30) Foreign Application Priority Data

May 13, 2015 (JP) ................................. 2015-098219
Feb. 5, 2016 (JP) ................................. 2016-020745

(51) Int. Cl.
*H04L 29/06* (2006.01)
*H04N 1/00* (2006.01)
*H04L 29/12* (2006.01)

(52) U.S. Cl.
CPC ...... *H04L 63/1433* (2013.01); *H04L 61/2514* (2013.01); *H04L 63/0236* (2013.01); *H04L 63/1441* (2013.01); *H04L 63/205* (2013.01); *H04N 1/00* (2013.01)

(58) Field of Classification Search
CPC ............. H04L 63/0236; H04L 63/1433; H04L 63/1441; H04L 63/205; H04L 61/2514; H04N 1/00
See application file for complete search history.

(56) References Cited

U.S. PATENT DOCUMENTS

2010/0235883 A1 9/2010 Sato
2016/0179443 A1* 6/2016 Saito ..................... G06F 3/1222
358/1.14

FOREIGN PATENT DOCUMENTS

JP 2010219757 A 9/2010

* cited by examiner

*Primary Examiner* — Minh Dinh
(74) *Attorney, Agent, or Firm* — Rossi, Kimms & McDowell LLP

(57) ABSTRACT

An information processing apparatus which is capable of preventing unauthorized access thereto. The information processing apparatus is capable of communicating with a server. An inquiry is made of the server about an IP address of the information processing apparatus, which is managed by the server. When it is determined that the IP address obtained from the server as a result of the inquiry and an IP address stored in the information processing apparatus match each other, a warning that a security level of the information processing apparatus is low is issued.

9 Claims, 11 Drawing Sheets

```
<HTML><HEAD>
<TITLE>CHECK GLOBAL ADDRESS</TITLE>
</HEAD>
<BODY>
159.61.30.1
</BODY>
```

FIG. 13

```
GET /server.net/?localIPAddress=192.168.1.100 HTTP/1.1
```
1301

```
<HTML><HEAD>
<TITLE>CHECK GLOBAL OPEN</TITLE>
</HEAD>
<BODY>
GLOBAL OPEN
</BODY>
```
1302

```
<HTML><HEAD>
<TITLE>CHECK GLOBAL OPEN</TITLE>
</HEAD>
<BODY>
NOT GLOBAL OPEN
</BODY>
```
1303

US 10,212,183 B2

INFORMATION PROCESSING APPARATUS THAT PREVENTS UNAUTHORIZED ACCESS THERETO, METHOD OF CONTROLLING THE INFORMATION PROCESSING APPARATUS, AND STORAGE MEDIUM

BACKGROUND OF THE INVENTION

Field of the Invention

The present invention relates to an information processing apparatus with a high level of security, a method of controlling the information processing apparatus, and a storage medium.

Description of the Related Art

Conventionally, an information processing apparatus that is connected to a local network and a global network is known. On the local network, a plurality of apparatuses such as a server and an information processing apparatus are connected to each other in a limited area such as an office, and data communications are carried out between those apparatuses on the local network. On the global network, a plurality of devices such as a server and an information processing apparatus are connected to each other via the Internet, and data communications are carried out between those apparatuses on the global network. The devices on the global network have respective global IP addresses as network addresses for use in data communications, and the global IP addresses of the devices are open to the other devices present on the global network. For this reason, based on an open global IP address of an information processing apparatus, a malicious user may access the information processing apparatus without authorization and also remotely control the information processing apparatus without authorization. When an information processing apparatus is remotely controlled without authorization, for example, a variety of setting values for the information processing apparatus may be changed, or personal information which the information processing apparatus has may be viewed and/or changed. Namely, devices that are connected to the global network and carry out communications using global IP addresses carry out commutations with low levels of security.

There is known an information processing apparatus which, to cope with the above problem, sends a ping command, which is for determining whether or not it is possible to communicate with devices connected to a global network, to a server (see, for example, Japanese Laid-Open Patent Publication (Kokai) No. 2010-219757). According to Japanese Laid-Open Patent Publication (Kokai) No. 2010-219757, when there is a response from the server to the ping command, the information processing apparatus determines that it is connected to the global network and inhibits remote control from devices connected to the global network. On the other hand, when there is no response from the server to the ping command, the information processing apparatus determines that it is not likely to be connected to the global network and does not inhibit remote control from other devices.

However, servers configured by default not to make a response to the ping command are lately increasing in number. Thus, when there is no response to the ping command, it cannot always be said that an information processing apparatus is not likely to be connected to a global network. Namely, if whether or not an information processing apparatus is connected to a global network is determined based on only the presence or absence of a response to the ping command, it may be erroneously determined that the information processing apparatus determines is not likely to be connected to the global network. As a result, remote control from other devices is not inhibited, and it is thus impossible to prevent a malicious user from accessing the information processing apparatus without authorization.

SUMMARY OF THE INVENTION

The present invention provides an information processing apparatus which is capable of preventing unauthorized access thereto, a method of controlling the information processing apparatus, and a storage medium.

Accordingly, the present invention provides an information processing apparatus capable of communicating with a server, comprising an inquiry unit configured to inquire of the server about an IP address of the information processing apparatus managed by the server, a determination unit configured to determine whether the IP address obtained from the server as a result of the inquiry by the inquiry unit and an IP address stored in the information processing apparatus match each other, and a warning unit configured to, when the determination unit determines that the IP address obtained from the server and the IP address stored in the information processing apparatus match each other, issue a warning that a security level of the information processing apparatus is low.

According to the present invention, unauthorized access to the information processing apparatus is prevented.

Further features of the present invention will become apparent from the following description of exemplary embodiments (with reference to the attached drawings).

BRIEF DESCRIPTION OF THE DRAWINGS

FIG. 13 is a view useful in explaining public determination request data and determination result data.

DESCRIPTION OF THE EMBODIMENTS

Hereafter, embodiments of the present invention will be described in detail with reference to the drawings. First, a detailed description will be given of a first embodiment of the present invention.

Figure 1:
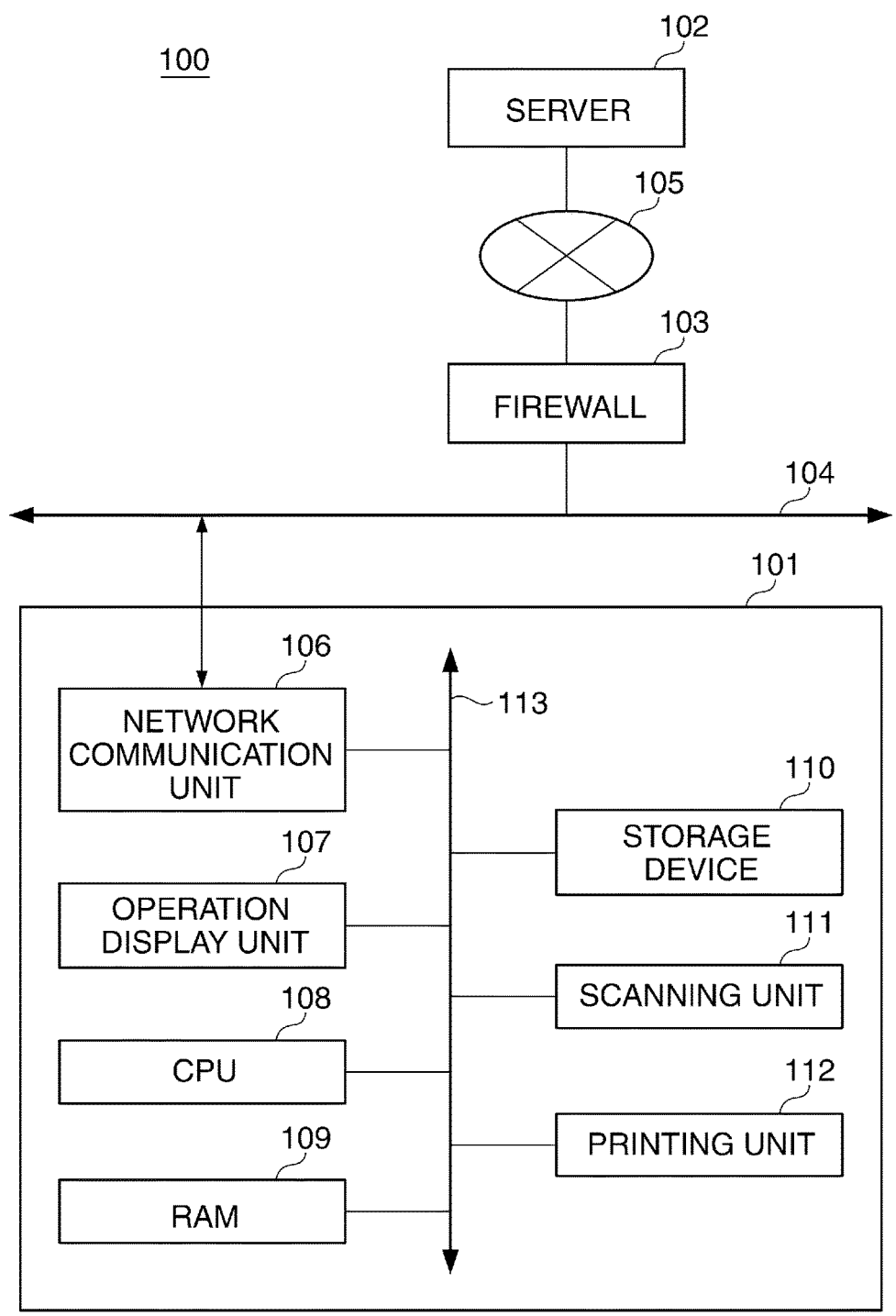
FIG. 1 is a conceptual diagram schematically showing an information processing system including an MFP which is an information processing apparatus according to a first embodiment of the present invention.

FIG. 1 is a conceptual diagram schematically showing an information processing system 100 including an MFP 101 which is an information processing apparatus according to the first embodiment of the present invention.

The information processing system 100 in FIG. 1 has the MFP 101, a server 102, a firewall 103, a LAN 104, and the Internet 105. The MFP 101 is connected to the firewall 103 via the LAN 104, and the server 102 and the firewall 103 are connected to each other via the Internet 105.

The MFP 101 has a network communication unit 106, an operation display unit 107, a CPU 108, a RAM 109, a storage device 110, a scanning unit 111, and a printing unit 112, and these component elements are connected to one another via a system bus 113. The network communication unit 106 sends and receives data and commands to and from an external apparatus such as the server 102. The operation display unit 107 has a liquid crystal panel and operating buttons and receives a variety of instructions from a user. The operation display unit 107 also produces a warning display 500 and displays a setting change consideration instruction screen 700, to be described later.

The CPU 108 controls the MFP 101 based on a variety of programs stored in the storage device 110. The RAM 109, which is a work memory for the CPU 108, stores computation data and a variety of programs for the CPU 108. The storage device 110, which is a nonvolatile storage medium such as an HDD, stores a variety of programs and a variety of software. The storage device 110 also stores a variety of setting information on the MFP 102 and a warning display reservation flag, to be described later. The storage device 110 also stores an IP address as a network address for use in communication with an external apparatus. The storage device 110 stores a local IP address or a global IP address as an IP address. A local IP address is not compatible with a global network, and hence when the MFP 101 connects to the global network, the firewall 103 performs translation of a local IP address into a global IP address (NAT: network address translation). In this case, the MFP 101 connects to the global network using the global IP address obtained by translation, and hence the local IP address is not open to the global network. To connect with a global network using a global IP address obtained by translation, NAT is always performed, and accordingly, the firewall 103 interposed between the MFP 101 and the global network. The firewall 103 blocks connection to the MFP 101 from other devices connected to the global network (hereafter referred to merely as "the other devices"). Therefore, when the storage device 110 stores a local IP address, the MFP 101 is not open to the global network, and there is no possibility of the MFP 101 being accessed without authorization by the other devices. On the other hand, since a global IP address is compatible with the global network, NAT of a global IP address by the firewall 103 is not required when the MFP 101 is connected to the global network. In this case, the MFP 101 connects to the global network using the global IP address, and hence the global IP address is open to the global network. When NAT is unnecessary, the firewall 103 is not interposed between the MFP 101 and the global network. Thus, when the storage device 110 stores the global IP address, the MFP 101 is open to the global network and may be accessed without authorization by the other devices. The scanning unit 111 reads an original to generate image data. The printing unit 112 prints image data on recording sheets.

When the MFP 101 is connected to the global network, the server 102 obtains and manages a global IP address (hereafter referred to as an "MFP open address") that has been used for the MFP 101 to connect with the global network. In the present embodiment, when the storage device 110 stores a local IP address, the server 102 manages a global IP address, which has been translated from a local IP address by NAT, as an MFP open address. When the storage device 110 stores a global IP address, the server 102 manages a global IP address, which has not been subjected to NAT, as an MFP open address. It should be noted that in the present embodiment, the LAN 104 is an exemplary local network, and the Internet 105 is an exemplary global network.

Figure 2:
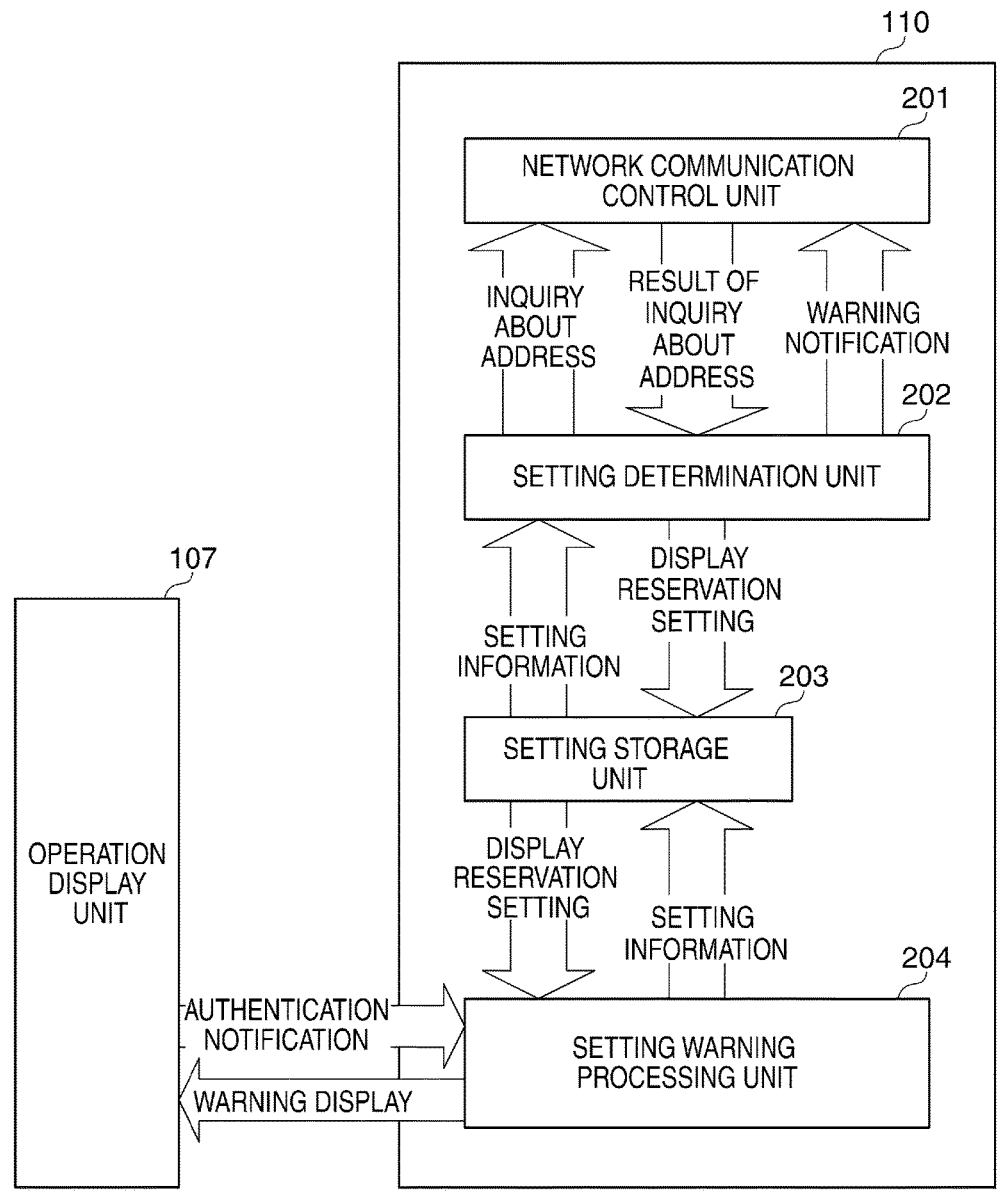
FIG. 2 is a diagram useful in explaining software stored in a storage device in FIG. 1.

FIG. 2 is a view useful in explaining software stored in the storage device 110 in FIG. 1.

The storage device 110 in FIG. 2 stores a network communication control unit 201, a setting determination unit 202, a setting storage unit 203, and a setting warning processing unit 204 as software. The network communication control unit 201 controls the network communication unit 106. The setting determination unit 202 determines whether or not to set a warning display reservation flag in the MFP 101. When the setting determination unit 202 determines to set a warning display reservation flag in the MFP 101, a warning display reservation flag is stored in the storage device 110. The setting warning processing unit 204 refers to the storage device 110, and when a warning display reservation flag is stored in the storage device 110, produces the warning display 500, to be described later, on the operation display unit 107.

The setting determination unit 202 also instructs the network communication control unit 201 to inquire of the server 102 about an MFP open address. Further, the setting determination unit 202 obtains a result of the inquiry which the network communication control unit 201 has received from the server 102. The setting storage unit 203 stores an IP address of the MFP 101, a warning display reservation flag, and so on in the storage device 110.

Figure 3:
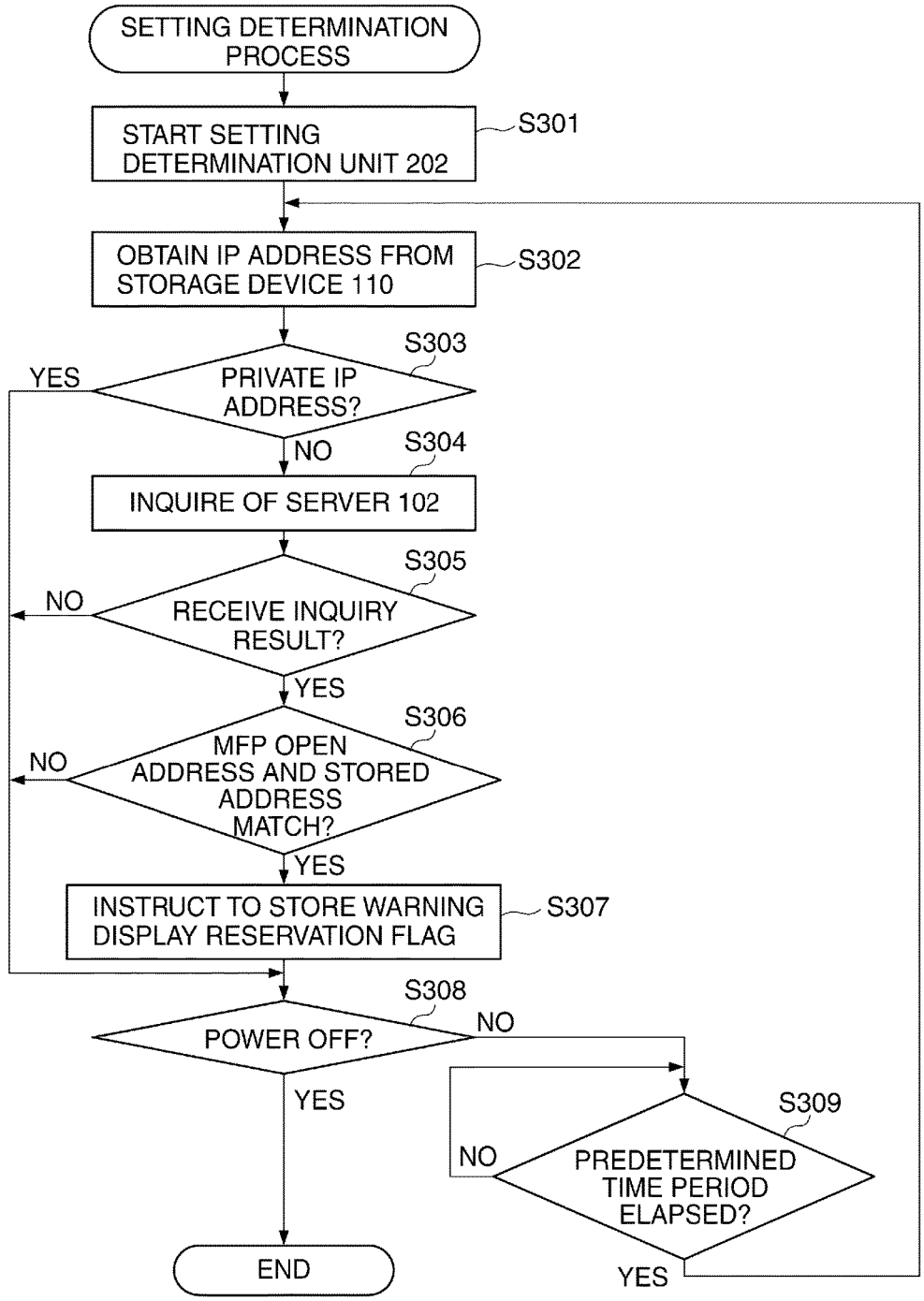
FIG. 3 is a flowchart showing the procedure of a setting determination process which is carried out by a setting determination unit in FIG. 2.

FIG. 3 is a flowchart showing the procedure of a setting determination process which is carried out by the setting determination unit 202 in FIG. 2.

Referring to FIG. 3, first, when a power switch of the MFP 101 is turned on, the setting determination unit 202 is started (step S301) to obtain an IP address stored in the storage device 110 (hereafter referred to as a "stored address") (step S302). Next, the setting determination unit 202 determines whether or not the stored address is a private IP address (step S303).

Here, a private IP address means an address defined by RFC 1918 or RFC 4193 that is the document issued by the voluntary organization IETF that promotes standardization of Internet technologies. RFC 1918 defines a private IP address when IPv4 is used as a communication protocol, and RFC 4193 defines a private IP address when IPv6 is used as a communication protocol. For example, RFC 1918 defines private IP addresses according to block sizes of data when data communication is carried out, for example, bit blocks such as a 24-bit block, a 20-bit block, and 16-bit block (Table 1). In the present embodiment, whether or not an IP address is a private IP address is determined based on whether or not this IP address is an IP address defined by RFC 1918 or RFC 4193.

TABLE 1

| RFC 1918 name | IP address range |
|---|---|
| 24-bit block | 10.0.0.0-10.255.255.255 |
| 20-bit block | 172.16.0.0-172.31.255.255 |
| 16-bit block | 192.168.0.0-192.168.255.255 |

Referring again to FIG. 3, as a result of the determination in the step S303, when the stored address is a private IP address, the process proceeds to step S308, to be described later. On the other hand, when the stored address is not a private IP address, the setting determination unit 202 inquires of the server 102 about an MFP open address, which is managed by the server 102, via the network communication control unit 201 (step S304). Then, in step S305, the setting determination unit 202 determines whether or not a result of the inquiry in the step S304 about an MFP open address has been received (step S305). It should be noted that the inquiry to the server 102 is made by sending request data 801 (FIG. 8A), to be described later, to the server 102. A result of the inquiry from the server 102 is received as response data 804 (FIG. 8B), to be described later. It should be noted that the response data 804 includes an MFP open address managed by the server 102.

As a result of the determination in the step S305, when a result of the inquiry has not been received, the process proceeds to the step S308, to be described later. On the other hand, when a result of the inquiry has been received, the setting determination unit 202 determines whether or not the MFP open address managed by the server 102 and the stored address match each other (step S306). Here, a case where the MFP open address managed by the server 102 and the stored address do not match each other corresponds to a case where the server 102 manages a global IP address, which has been obtained by NAT, as the MFP open address. Thus, when the MFP open address managed by the server 102 and the stored address do not match each other, it is determined that the firewall 103 is interposed between the MFP 101 and the global network, and the MFP 101 is not open to the global network. On the other hand, a case where the MFP open address managed by the server 102 and the stored address match each other corresponds to a case where the server 102 manages a global IP address, which has not been obtained by NAT, as the MFP open address. Thus, when the MFP open address and the stored address match each other, it is determined that the firewall 103 is not interposed between the MFP 101 and the global network, and the MFP 101 is open to the global network.

As a result of the determination in the step S306, when the MFP open address and the stored address do not match each other, the process proceeds to the step S308, to be described later. On the other hand, when the MFP open address and the stored address match each other, the setting determination unit 202 instructs the setting storage unit 203 to store a warning display reservation flag in the storage device 110 (step S307). The setting determination unit 202 then determines whether or not the power switch of the MFP 101 has been turned off (step S308).

As a result of the determination in the step S308, when the power switch of the MFP 101 has not been turned off, the setting determination unit 202 determines whether or not a time period set in advance in the MFP 101 has elapsed (step S309). As a result of the determination in the step S309, when the time period set in advance in the MFP 101 has not elapsed, the process returns to the step S309, and when the time period set in advance in the MFP 101 has elapsed, the process returns to the step S302. As a result of the determination in the step S308, when the power switch of the MFP 101 has been turned off, the setting determination unit 202 terminates the present process.

Figure 4:
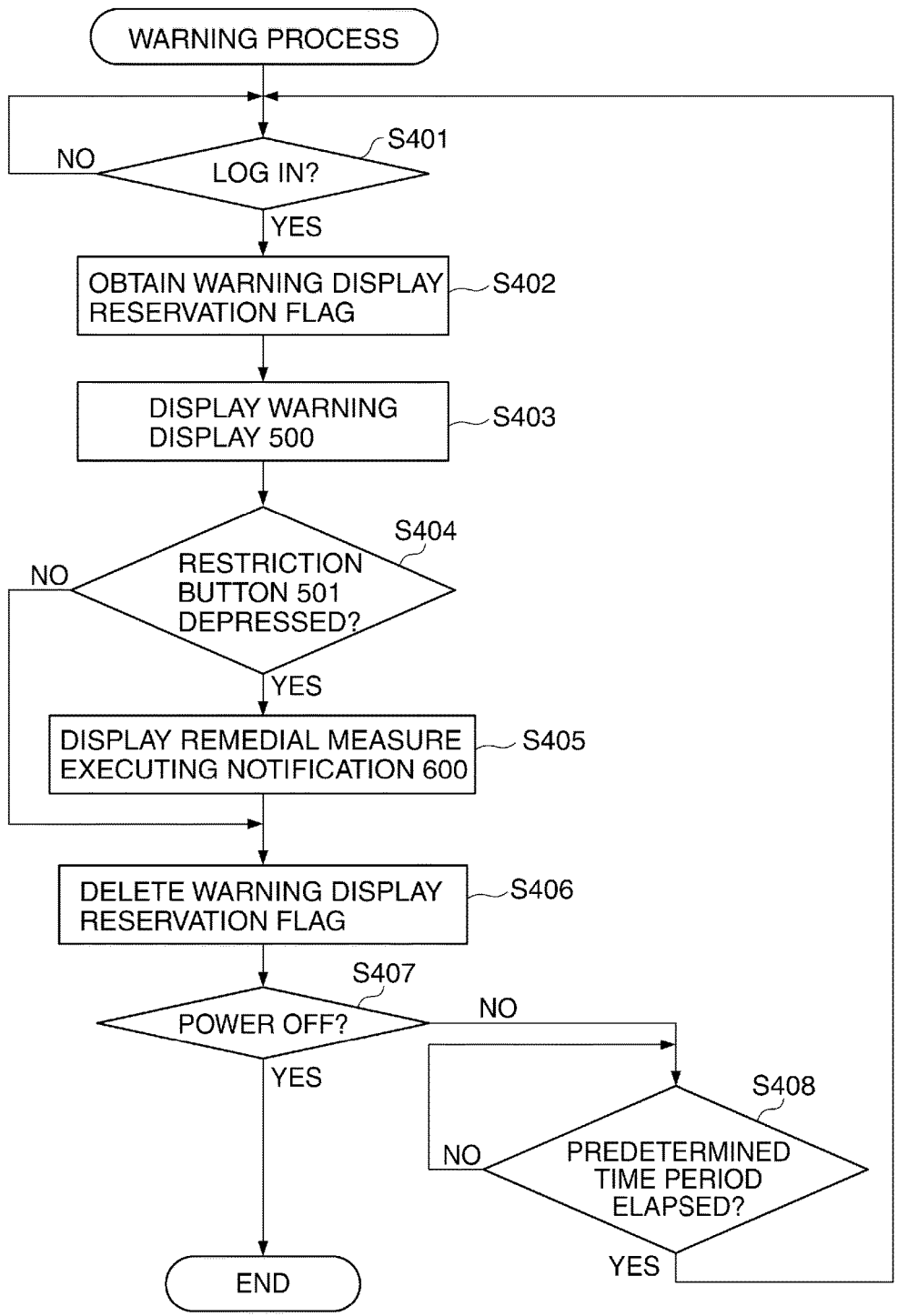
FIG. 4 is a flowchart showing the procedure of a warning process which is carried out by a setting warning processing unit in FIG. 2 when a warning display reservation flag is stored in the storage device in step S307 in FIG. 3.

FIG. 4 is a flowchart showing the procedure of a warning process which is carried out by the setting warning processing unit 204 in FIG. 2 when the warning display reservation flag is stored in the storage device 110 in the step S307 in FIG. 3. The process in FIG. 4 is based on the assumption that it is carried out when a user has logged in to the MFP 101, which has a login function, so that the user can reliably recognize the warning display 500 produced on the operation display unit 107 in step S403, to be described later. Ordinarily, users who log in to the MFP 101 are classified into an administrative user who administrates security conditions of the MFP 101 and general users other than the administrative user. The process in FIG. 4 includes a case where a user makes a determination as to change of settings on the MFP 101 in step S404, to be described later, and hence it is preferred that the process in FIG. 4 is carried out when the administrative user has logged in to the MFP 101. It should be noted that when the MFP 101 has no login function, step S401, to be described later, is skipped in the process in FIG. 4.

Figure 5:
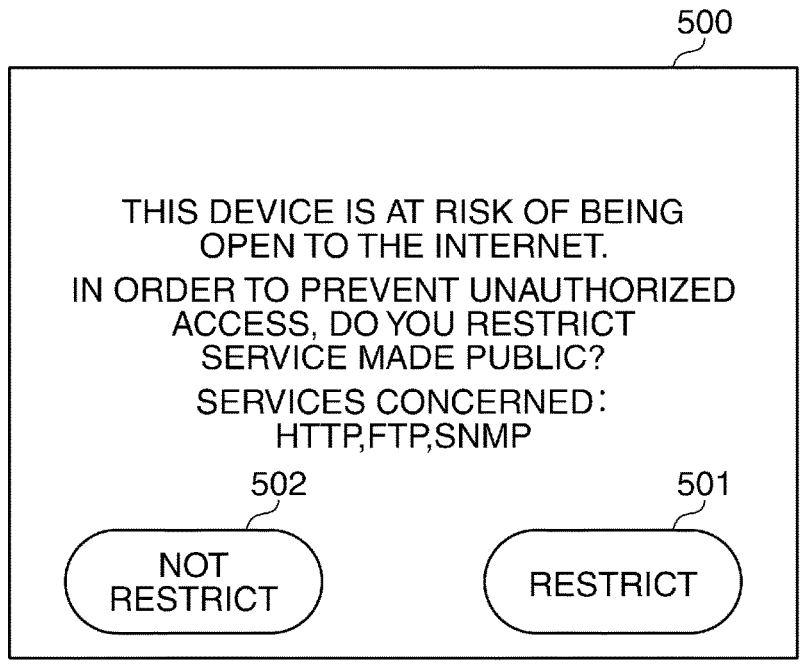
FIG. 5 is a view useful in explaining a warning display produced on an operation display unit in FIG. 1 in step S403 in FIG. 4.

Referring to FIG. 4, first, the setting warning processing unit 204 determines whether or not a user has logged in to the MFP 101 (step S401). As a result of the determination in the step S401, when no user has logged in to the MFP 101, the process returns to the step S401, and when a user has logged in to the MFP 101, the setting warning processing unit 204 obtains the warning display reservation flag stored in the storage device 110 (step S402). The setting warning processing unit 204 produces the warning display 500 (FIG. 5), which indicates that the MFP 101 is at risk of being open to the global network, on the operation display unit 107 (step S403). In the present embodiment, producing the warning display 500 on the operation display unit 107 notifies the user that the MFP 101 is at risk of being open to the global network and accessed without authorization and remotely controlled by devices on the Internet 105.

The warning display 500 has a restriction button 501 and a non-restriction button 502. The warning display 500 indicates a warning that the MFP 101 is at risk of being open to the global network and shows a remedial measure of stopping a communication protocol, for example, HTTP, FTP, or SNTP so as to eliminate the risk. When the user depresses the restriction button 501, the communication protocol is stopped to reduce the risk of the MFP 101 being open to the global network. When the user depresses the non-restriction button 502, the communication protocol is not stopped, and the risk of the MFP 101 being open to the global network is not reduced.

Figure 6:
FIG. 6 is a view useful in explaining a remedial measure executing notification displayed on the operation display unit in FIG. 1 in step S405 in FIG. 4.

Referring again to FIG. 4, the setting warning processing unit 204 determines whether or not the restriction button 501, which the warning display 500 has, has been depressed (step S404). As a result of the determination in the step S404, when the restriction button 501 has been depressed (YES in the step S404), the setting warning processing unit 204 instructs the setting storage unit 203 to stop a communication protocol and causes the operation display unit 204 to display a remedial measure execution notification 600 (FIG. 6) (step S405). After that, the setting warning processing unit 204 deletes the warning display reservation flag from the storage device 110 (step S406). On the other hand, when the non-restriction button 502 has been depressed (NO in the step S404), the process proceeds to step S406 with the step S405 skipped. The setting warning processing unit 204 determines whether or not the power switch of the MFP 101 has been turned off (step S407).

As a result of the determination in the step S407, when the power switch of the MFP 101 has not been turned off, the setting warning processing unit 204 determines whether or not a time period set in advance in the MFP 101 has elapsed (step S408). As a result of the determination in the step S408, when the time period set in advance in the MFP 101 has not elapsed, the process returns to the step S408, and when the time period set in advance in the MFP 101 has elapsed, the process returns to the step S401. As a result of the determination in the step S407, when the power switch of the MFP 101 has been turned off, the setting warning processing unit 204 terminates the present process.

According to the processes in FIGS. 3 and 4, when the MFP open address managed by the server 102 and the stored address match each other (YES in the step S306), the warning display 500 is produced on the operation display unit 107 (step S403). The case where the MFP open address and the stored address match each other is nothing short of a case where the MFP 101 is open to the global network. Namely, this is nothing short of a case where the MFP 101 is at risk of being accessed without authorization and remotely controlled by devices on the Internet 105. In this case, the warning display 500 is produced on the operation display unit 107, and this enables the user to recognize that there is a high possibility that the MFP 101 may be accessed without authorization by a malicious user, and it is necessary to remedy a situation in which the security level of the MFP 101 is low. As a result, unauthorized access to the MFP 101 is prevented.

Moreover, according to the processes in FIGS. 3 and 4, when the warning display reservation flag is stored in the storage device 110 (step S307), the warning display 500 is produced on the operation display unit 107 (step S403). The warning display 500 indicates that as a remedial measure for eliminating the risk of the MFP 101's global IP address being open, a communication protocol is to be stopped, and when this remedial measure is taken, the communication protocol is stopped. This reliably prevents the MFP 101 from being accessed without authorization by a malicious user.

Further, according to the process in FIG. 4, when, of the restriction button 501 and the non-restriction button 502 which the warning display 500 has, the restriction button 501 is selected, a remedial measure shown in the warning display 500 is taken. As a result, a user's intension is reflected on a remedial measure for the security level of the MFP 101.

Figure 7:
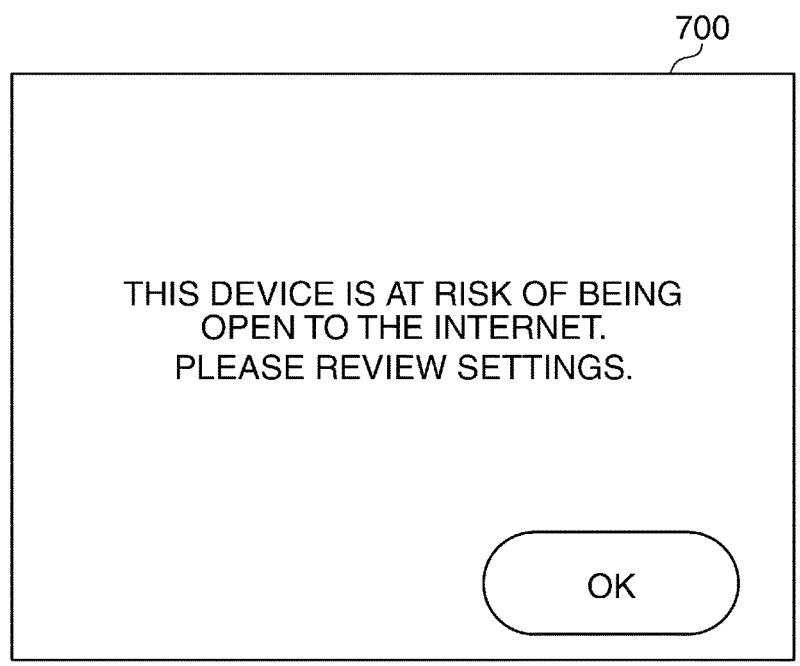
FIG. 7 is a view useful in explaining a setting change consideration instruction screen displayed in place of the warning display in FIG. 5 in the step S403 in FIG. 4.

It should be noted that although in the above description, the warning display 500 indicating a warning and a remedial measure is displayed on the operation display unit 107 in the step S403, a setting change consideration instruction screen 700 (FIG. 7) may be displayed in place of the warning display 500 on the operation display unit 107. In this case, the setting change consideration instruction screen 700 indicates only a warning without showing any concrete remedial measures. This enables the user to recognize that the security level of the MFP 101 is low. When the setting change consideration instruction screen 700 is displayed on the operation display unit 107 in the step S403, the setting warning processing unit 204 carries out the process in the step S403, followed by the process proceeding to the step S406 with the steps S404 and S405 skipped.

Figure 8A:
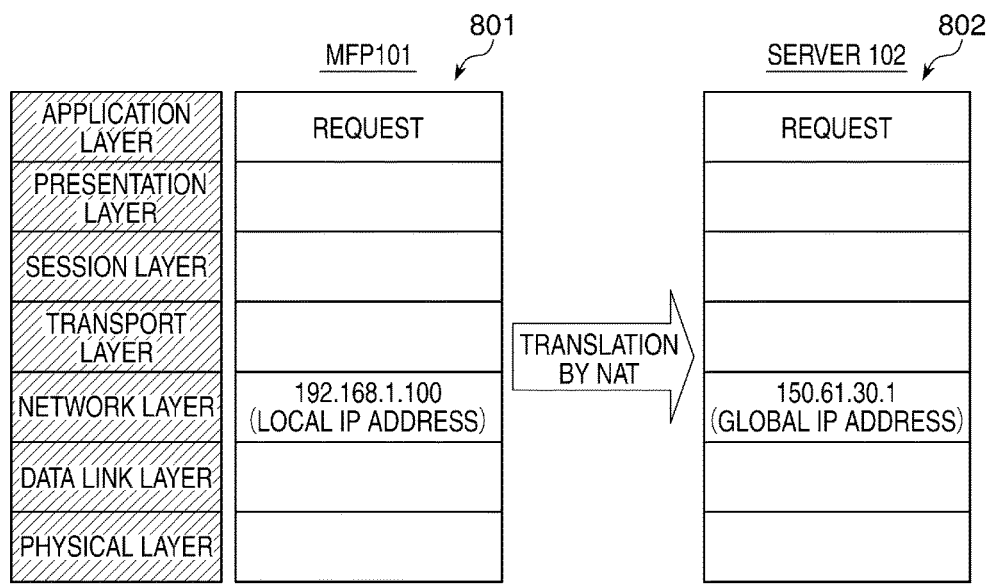
FIGS. 8A and 8B are diagrams useful in explaining request data and response data transmitted and received by the MFP in FIG. 1.
Figure 8B:
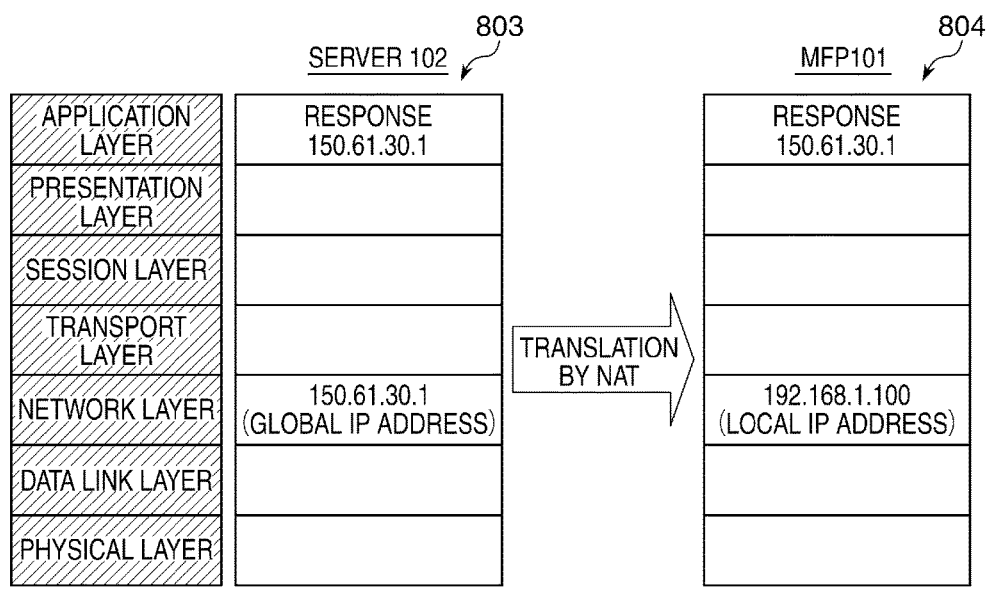

FIGS. 8A and 8B are views useful in explaining request data and response data that is transmitted and received by the MFP 101 in FIG. 1. FIG. 8A shows request data that is transmitted to the server 102 by the MFP 101, and FIG. 8B shows response data that is received from the server 102 by the MFP 101. All the request data 801 and 802 and the response data 803 and 804 are communicated using a communication protocol comprised of seven layers (hereafter referred to as "the OSI 7-layer"). The request data 801 and 802 and the response data 803 and 804 include at least the application layer and the network layer. The MFP 101 generates the request data 801 and transmits the same to the firewall 103. The firewall 103 transmits the request data 801 as the request data 802 to the server 102. The server 102 generates the response data 803 and transmits the same to the firewall 103. The firewall 103 transmits the response data 803 as the response data 804 to the server 102.

In the application layer, for example, whether communicated data is request data or response data is indicated, and when communicated data is response data, an IP address is indicated. For example, in the application layer of the response data 803 and 804, an IP address of the MFP 101 managed by the server 102 is indicated. It should be noted that here as well, the server 102 manages only a global IP address of the MFP 101, and hence the IP address of the MFP 101 in the application layer of the response data 803 generated by the server 102 is the global IP address. In the network layer, for example, packet data having an IP address for identifying a sender and a destination of communicated data is generated. The packet data is comprised of a header section and a body section, and the body section has an IP address for identifying a sender and a destination (see "BODY" in FIG. 9). For example, in the network layer of the response data 803 and 804, an IP address of the MFP 101 which is a destination is indicated. It should be noted that the server 102 manages only a global IP address of the MFP 101, and hence the IP address of the MFP 101 in the network layer of the response data 803 generated by the server 102 is also the global IP address. The firewall 103 translates a local IP address in a body section of packet data in the network layer into a global IP address by NAT, or translates a global IP address in a body section of packet data into a local IP address by NAT. On the other hand, an IP address indicated in the application layer of response data is not subjected to NAT by the firewall 103. Thus, for example, in the response data 803 and 804, a global IP address "150.61.30.1" of the MFP 101 indicated in the application layer arrives at the MFP 101 without being subjected to NAT. On the other hand, a global IP address "150.61.30.1" in the network layer is translated into a local IP address "192.168.1.100" of the MFP 101 by NAT and arrives at the MFP 101.

For example, referring to FIG. 8A, the MFP 101 transmits the request data 801 to the server 102 by way of the firewall 103. In the application layer, it is indicated that data transmitted to the server 102 by the MFP 101 is the request data 801. In the network layer, packet data including a local IP address "192.168.1.100" of the MFP 101, which indicates that a sender is the MFP 101, is generated, and the packet data is transmitted to the server 102.

The local IP address "192.168.1.100" of the MFP 101 included in the packet data transmitted to the server 102 is translated into a global IP address "150.61.30.1" through NAT by the firewall 103. Therefore, the server 102 receives the request data 802 including the global IP address "150.61.30.1" of the MFP 101, which is a sender, translated from the local IP address "192.168.1.100" of the MFP 101 by NAT.

Also, referring to FIG. 8B, the server 102 transmits the response data 803 to the MFP 101 by way of the firewall 103. In the application layer, it is indicated that data transmitted to the MFP 101 by the server 102 is the response data 803. Also, in the application layer, a global IP address "150.61.30.1" of the MFP 101 managed by the server 102 is indicated. As described above, the global IP address "150.61.30.1" of the MFP 101 indicated in the application layer is not subjected to NAT by the firewall 103. Therefore, the global IP address "150.61.30.1" of the MFP 101 indicated in the application layer is unchanged in the response data 804, to be described later, as well. On the other hand, in the network layer, packet data including the global IP address "150.61.30.1" of the MFP 101, which is a sender, is generated, and the packet data is transmitted to the MFP 101 by way of the firewall 103. At this time, the global IP address "150.61.30.1" of the MFP 101 included in the packet data transmitted to the MFP 101 is translated into a local IP address "192.168.1.100" of the MFP 101 through NAT by the firewall 103. As a result, the MFP 101 receives the response data 804 including the local IP address "192.168.1.100" of the MFP 101, which is a sender, translated from the global IP address "150.61.30.1" of the MFP 101 by NAT. Namely, when the MFP 101 receives the response data 804, the global IP address of the MFP 101 cannot be recognized with the network layer, but the global IP address of the MFP 101 can be recognized with the application layer.

Figures 9, 10:
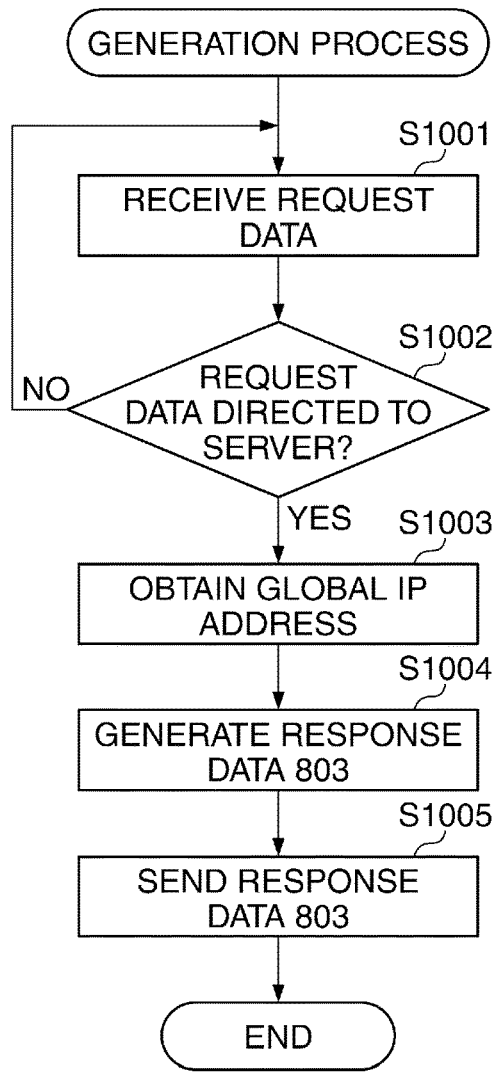
FIG. 9 is a view useful in explaining packet data that is used to send and receive an IP address which the request data and the response data in FIGS. 8A and 8B have.
FIG. 10 is a flowchart showing the procedure of a generation process in which a server in FIGS. 8A and 8B generates the response data.

FIG. 10 is a flowchart showing the procedure of a generation process in which the server 102 in FIGS. 8A and 8B generates the response data 803. The process in FIG. 10 is carried out by the server 102.

Referring to FIG. 10, first, the server 102 receives the request data 802 (step S1001) and determines whether or not the request data 802 is directed to the server 102 (step S1002).

As a result of the determination in the step S1002, when the request data 802 is not directed to the server 102, the process returns to the step S1001. On the other hand, when the request data 802 is directed to the server 102, the server 102 obtains a global IP address of the MFP 101 which is a sender indicated in the network layer (step S1003).

Then, the server 102 generates the response data 803 (step S1004). At this time, an IP address indicated in the application layer and the network layer of the response data 803 is the global IP address obtained in the step S1003, that is, the global IP address of the MFP 101. After that, the server 102 transmits the generated response data 803 to the MFP 101 (step S1005) and terminates the present process.

According to the process in FIG. 10, the response data 803 in which the IP address indicated in the application layer and the network layer is the global IP address of the MFP 101 is generated (step S1004). When the response data 803 goes through the firewall 103, the global IP address of the MFP 101 is translated into a local IP address by NAT in the network layer. On the other hand, when the response data 804 is generated from the response data 803, the global IP address of the MFP 101 is unchanged in the application layer. At this time, the MFP 101 that has received the response data 804 compares the IP address indicated in the application layer with the stored address. When the compared two addresses are different, the storage address is considered to be an address different from a global IP address of the MFP 101, that is, the storage address is considered to be a local IP address of the MFP 101. Namely, the MFP 101 recognizes that a local IP address has been translated into a global IP address by NAT. It should be noted that in a case where a local IP address is translated into a global IP address by NAT, the firewall 103 is interposed between the MFP 101 and the global network as described above, and hence the MFP 101 is not likely to be accessed without authorization by the other devices. On the other hand, when the compared two addresses are the same, the storage address is considered to be a global IP address of the MFP 101, and it is considered that NAT has not been performed. When NAT has not been performed, the firewall 103 is not interposed between the MFP 101 and the global network, and hence the MFP 101 may be accessed without authorization by the other devices. In this case, a warning is issued to the administrator of the MFP 101 to urge him or her to restrict public ports. This prevents the MFP 101 from being remotely controlled by the other devices connected to the Internet 105. It should be noted that the MFP 101 that has received the response data 804 may compare an IP address indicated in the application layer with an IP address indicated in the network layer to determine whether or not NAT has been performed.

A detailed description will now be given of a second embodiment of the present invention.

The present embodiment is basically the same as the first embodiment described above in terms of constructions and operations, and features of constructions and operations that are the same as those in the first embodiment will thus not be described, only constructions and operations different from those of the first embodiment being described below. Specifically, in the first embodiment described above, the MFP 101 compares two IP addresses with each other to determine whether or not NAT has been performed. On the other hand, in the present embodiment, the server 102 compares two IP addresses with each other to determine whether or not NAT has been performed. The following description of the present embodiment mainly focuses on a comparison between two IP addresses by the server 102.

In the present embodiment, in the storage device 110, the setting determination unit 202 sends a public determination request, which inquires about whether or not the MFP 101 is open to the global network, to the network communication control unit 201 as distinct from the first embodiment. The network communication control unit 201 sends the public determination request to the server 102. The network communication control unit 201 receives a response to the public determination request (determination result) from the server 102. The network communication control unit 201 also sends the determination result to the setting determination unit 202.

Figure 11:
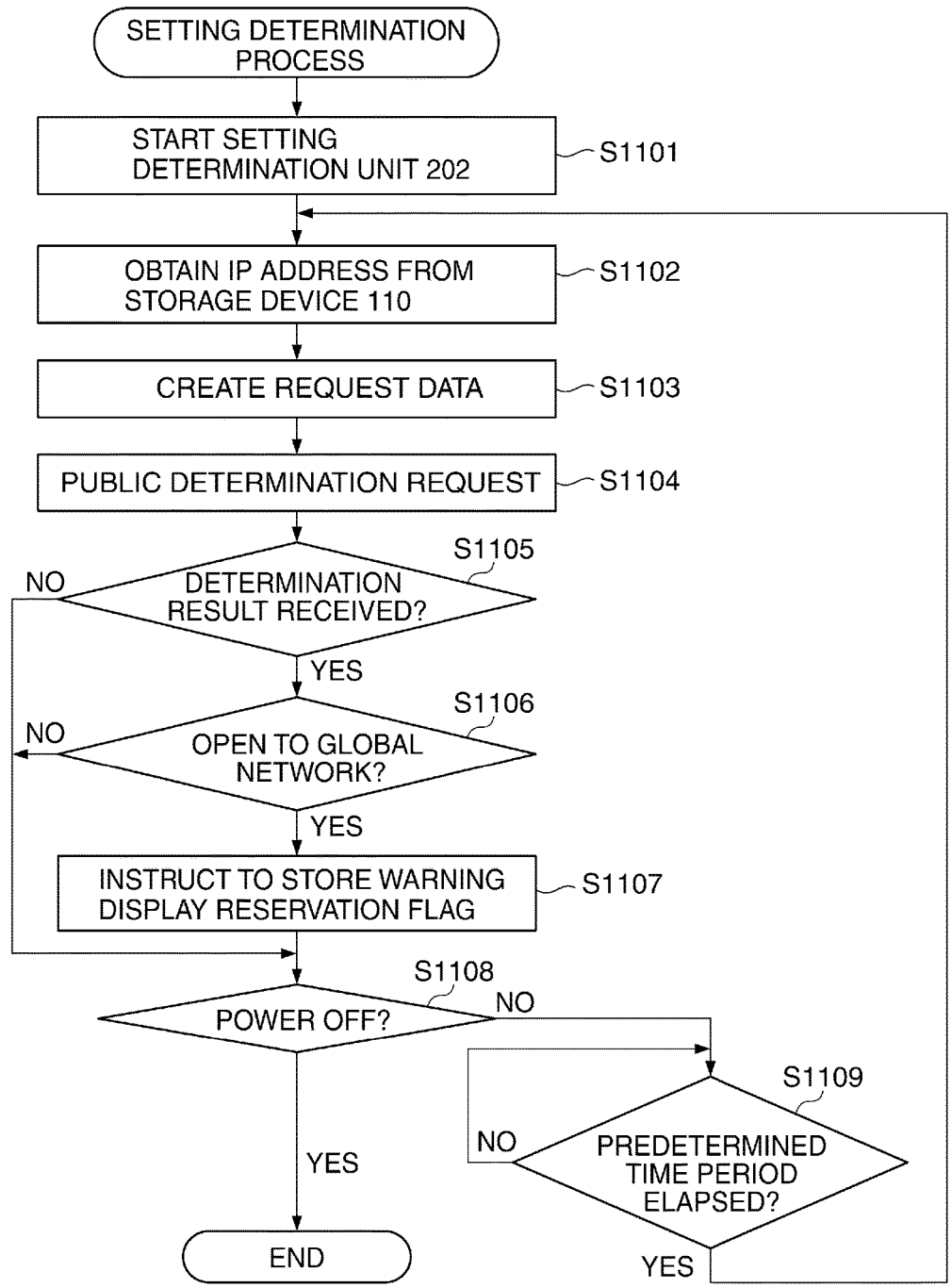
FIG. 11 is a flowchart showing the procedure of a setting determination process which is carried out in a second embodiment of the present invention.

FIG. 11 is a flowchart showing the procedure of a setting determination process which is carried out in the present embodiment. The process in FIG. 11 is carried out by the MFP 101.

Referring to FIG. 11, first, when the power switch of the MFP 101 is turned on, the setting determination unit 202 is started (step S1101) to obtain a stored address from the storage device 110 (step S1102). Next, the MFP 101 generates public determination request data 1301, which is for making a public determination request, using the obtained stored address (step S1103). As shown in FIG. 13, the public determination request data 1301 includes the stored address (represented by "192.168.1.100" in the figure). Then, the MFP 101 transmits the request data 801 with the public determination request data 1301 included therein to the server 102 (step S1104). The transmission of the request data 801 to the server 102 at this time corresponds to the transmission of the public determination request to the server 102 by the network communication control unit 201. When the request data 801 is transmitted to the server 102, the firewall 103 does not perform NAT on the stored address in the public determination request data 1301. Detailed description of a response from the server 102 to the public determination request will be given later with reference to FIG. 12. After that, in step S1105, the MFP 101 determines whether or not it has received determination result data that is a response to the public determination request (step S1105). Here, the determination result data includes a result of determination as to whether the MFP 101 is open to the global network. Specifically, as shown in FIG. 13, when it is determined that the MFP 101 is open to the global network, determination result data 1302 (reply) includes a character string "GLOBAL OPEN", which indicates the MFP 101 is open to the global network, in its body section. When it is determined that the MFP 101 is not open to the global network, determination result data 1303 (reply) includes a character string "NOT GLOBAL OPEN", which indicates the MFP 101 is not open to the global network, in its body section.

Referring to FIG. 11, as a result of the determination in the step S1105, when the determination result data 1302 (1303) has not been received, the process proceeds to step S1108, to be described later. On the other hand, when the determination result data 1302 (1303) has been received, the MFP 101 determines whether or not the MFP 101 is open to the global network based on a character string included in the body section of the determination result data 1302 (1303) (step S1106). As a result of the determination in the step S1106, when the MFP 101 is not open to the global network, the process proceeds to the step S1108, to be described later. On the other hand, when the MFP 101 is open to the global network, the MFP 101 instructs the setting storage unit 203 to store a warning display reservation flag in the storage device 110 (step S1107). The MFP 101 then determines whether or not the power switch of the MFP 101 has been turned off (step S1108).

As a result of the determination in the step S1108, when the power switch of the MFP 101 has not been turned off, the MFP 101 determines whether or not a time period set in advance in the MFP 101 has elapsed (step S1109). As a result of the determination in the step S1109, when the time period set in advance in the MFP 101 has not elapsed, the process returns to the step S1109, and when the time period set in advance in the MFP 101 has elapsed, the process returns to the step S1102. As a result of the determination in the step S1108, when the power switch of the MFP 101 has been turned off, the MFP 101 terminates the present process.

Figure 12:
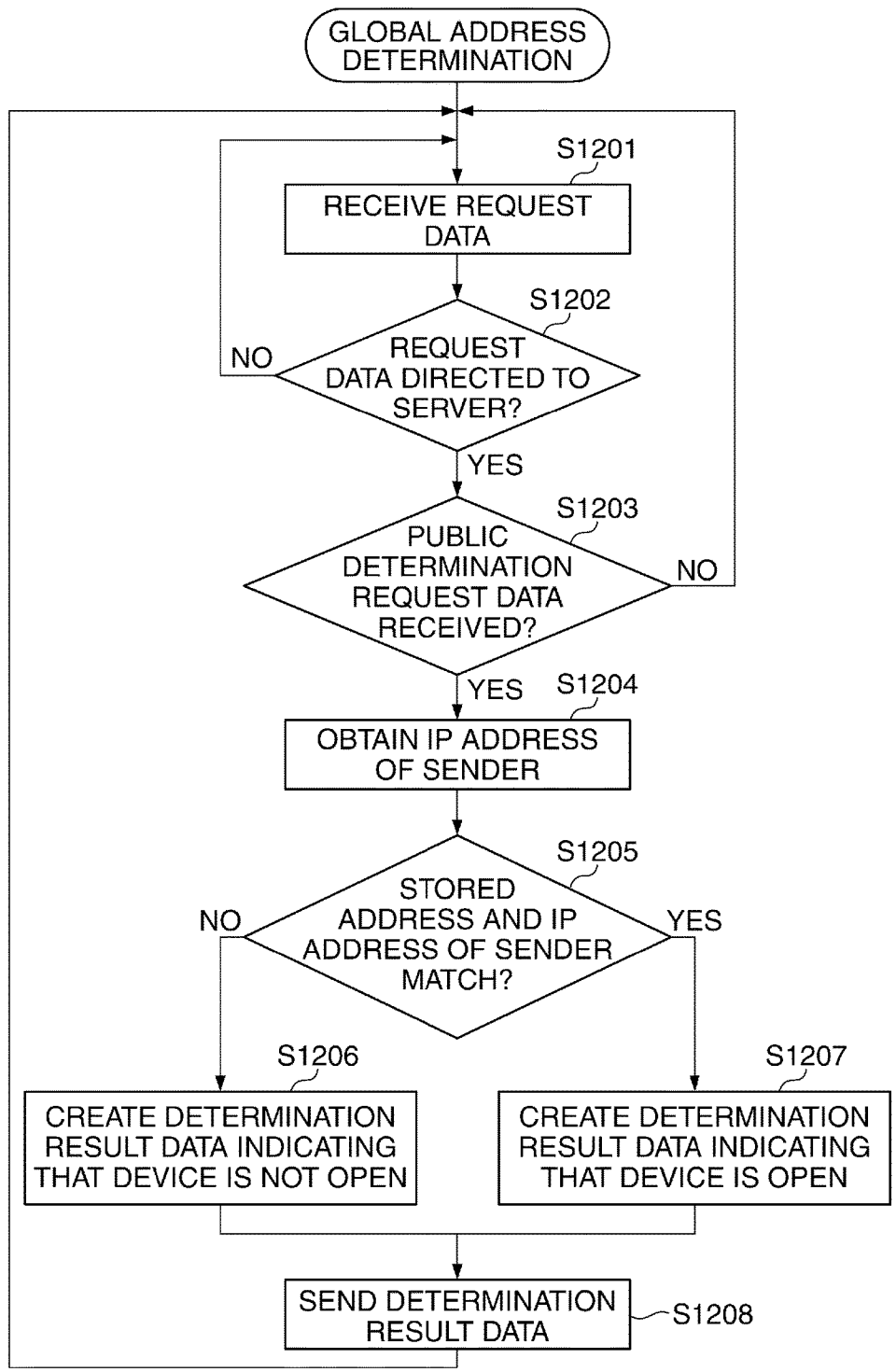
FIG. 12 is a flowchart showing the procedure of a global address determination process which is carried out in the second embodiment of the present invention.

FIG. 12 is a flowchart showing the procedure of a global address determination process which is carried out in the present embodiment. In the process in FIG. 12, the server 102 determines whether or not the MFP 101 is open to the global network.

Referring to FIG. 12, first, the server 102 receives the request data 802 (step S1201) and determines whether or not the request data 802 is directed to the server 102 (step S1202). As a result of the determination in the step S1202, when the request data 802 is not directed to the server 102, the process returns to the step S1201. On the other hand, when the request data 802 is directed to the server 102, the process proceeds to step S1203, in which the server 102 in turn determines whether or not the public determination request data 1301 has been received (step S1203). As a result of the determination in the step S1203, when the public determination request data 1301 has not been received, the process returns to the step S1201. When the public determination request data 1301 has been received, the server 102 obtains an IP address of a sender from packet data in the network layer of the request data 802 (step S1204).

Next, in step S1205, the server 102 obtains a stored address included in the public determination request data 1301 and determines whether or not the stored address matches the IP address of the sender obtained in the step S1204. As described above, the firewall 103 does not perform NAT on the stored address in the public determination request data 1301. On the other hand, the IP address of the sender may be either subjected to NAT or not subjected to NAT by the firewall 103. Here, a case where the stored address and the IP address of the sender obtained in the step S1204 do not match each other (NO in the step S1205) corresponds to a case where the IP address of the sender has been subjected to NAT. A case where the IP address of the sender has been subjected to NAT corresponds to a case where the firewall 103 is interposed between the MFP 101 and the global network. In this case, the server 102 determines that the MFP 101 is not open to the global network, and creates the determination result data 1303 (step S1206). On the other hand, a case where the stored address and the IP address of the sender obtained in the step S1204 match each other (YES in the step S1205) corresponds to a case where the IP address of the sender has not been subjected to NAT. A case where the IP address of the sender has not been subjected to NAT corresponds to a case where the firewall 103 is not interposed between the MFP 101 and the global network. In this case, the server 102 determines that the MFP 101 is open to the global network, and creates the determination result data 1302 (step S1207). The server 102 then sends the determination result data 1302 or 1303 to the MFP 101 (step S1208), followed by the process returning to the step S1201.

According to the processes in FIGS. 4, 11, and 12, when the MFP 101 is open to the global network, the server 102 creates the determination result data 1303 indicating that the MFP 101 is open to the global network (step S1207). Further, the operation display unit 107 of the MFP 101 that has received the determination result data 1303 produces the warning display 500 (step S403). This enables the user to recognize that there is a high possibility that the MFP 101 may be accessed without authorization by a malicious user, and it is necessary to remedy a situation in which the security level of the MFP 101 is low.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-098219, filed May 13, 2015 and No. 2016-020745, filed Feb. 5, 2016 which are hereby incorporated by reference wherein in their entirety.

What is claimed is:

1. An information processing apparatus capable of communicating with a server, comprising:
   a memory configured to store instructions; and
   a processor configured to execute the instructions to provide:
      an inquiry unit configured to inquire of the server about an IP address of the information processing apparatus managed by the server;
      a determination unit configured to determine whether the IP address obtained from the server as a result of the inquiry by said inquiry unit and an IP address stored in the information processing apparatus match each other; and
      a warning unit configured to, when said determination unit determines that the IP address obtained from the server and the IP address stored in the information processing apparatus match each other, issue a warning that a security level of the information processing apparatus is low.

2. The information processing apparatus according to claim 1, wherein the processor is further configured to execute the instructions to provide an execution unit configured to, when said determination unit determines that the IP address obtained from the server and the IP address stored in the information processing apparatus match each other, execute a remedial measure to improve the security level of the information processing apparatus.

3. The information processing apparatus according to claim 2, wherein said execution unit executes the remedial measure according to an instruction from a user.

4. The information processing apparatus according to claim 1, wherein in response to a user logging in to the information processing apparatus, said warning unit issues the warning that the security level of the information processing apparatus is low.

5. The information processing apparatus according to claim 1, wherein in response to a specific user logging in to the information processing apparatus, said warning unit issues the warning that the security level of the information processing apparatus is low.

6. The information processing apparatus according to claim 5, wherein the specific user is an administrative user who administrates security of the information processing apparatus.

7. The information processing apparatus according to claim 1, wherein the information processing apparatus is a printing apparatus that performs printing.

8. A method of controlling an information processing apparatus capable of communicating, with a server, the method comprising:
   inquiring of the server about an IP address of the information processing apparatus managed by the server;
   determining whether the IP address obtained from the server as a result of the inquiry and an IP address stored in the information processing apparatus match each other; and
   when it is determined that the IP address obtained from the server and the IP address stored in the information processing apparatus match each other, issuing a warning that a security level of the information processing apparatus is low.

9. A non-transitory computer-readable storage medium storing a program for causing a computer to execute a method of controlling an information processing apparatus, the method of controlling the information processing apparatus comprising:
   inquiring of the server about an IP address of the information processing apparatus managed by the server;
   determining whether the IP address obtained from the server as a result of the inquiry and an IP address stored in the information processing apparatus match each other; and
   when it is determined that the IP address obtained from the server and the IP address stored in the information processing apparatus match each other, issuing a warning that a security level of the information processing apparatus is low.

* * * * *